US012692726B2

(12) United States Patent
Fries

(10) Patent No.: US 12,692,726 B2
(45) Date of Patent: Jul. 28, 2026

(54) ANTI-THEFT DEVICE

(71) Applicant: Austin M. Fries, Waynesville, OH (US)

(72) Inventor: Austin M. Fries, Waynesville, OH (US)

( * ) Notice: Subject to any disclaimer, the term of this patent is extended or adjusted under 35 U.S.C. 154(b) by 52 days.

(21) Appl. No.: 18/809,066

(22) Filed: Sep. 9, 2024

(65) Prior Publication Data

US 2025/0012115 A1 Jan. 9, 2025

Related U.S. Application Data

(63) Continuation-in-part of application No. 17/722,349, filed on Apr. 17, 2022, now Pat. No. 12,104,412.

(51) Int. Cl.
*E05B 73/00* (2006.01)
*E05B 17/14* (2006.01)

(52) U.S. Cl.
CPC .......... *E05B 73/007* (2013.01); *E05B 17/142* (2013.01); *E05B 73/0064* (2013.01); *E05B 73/0082* (2013.01)

(58) Field of Classification Search
CPC ........ E05B 17/14; E05B 17/142; E05B 17/18; E05B 17/186; E05B 67/36; E05B 67/38; E05B 67/383; E05B 73/0017; E05B 73/0023; E05B 73/007; E05B 73/0076; E05B 73/0082
See application file for complete search history.

(56) References Cited

U.S. PATENT DOCUMENTS

| | | | | |
|---|---|---|---|---|
| 4,574,602 A * | 3/1986 | Furuse | F16B 41/005 70/276 |
| 5,063,763 A | 11/1991 | Johnson | |
| 5,097,686 A * | 3/1992 | Plumer | E05B 35/008 70/346 |
| 5,388,434 A * | 2/1995 | Kalis | E05B 13/101 248/553 |
| 5,737,948 A * | 4/1998 | Lefkovits | E05B 17/142 70/164 |
| 7,243,514 B2 * | 7/2007 | Frantz | E05B 13/101 411/910 |
| 7,409,843 B1 * | 8/2008 | Rinehart, Sr. | F16B 41/005 70/258 |
| 10,000,945 B2 | 6/2018 | Frantz | |
| 2008/0264118 A1 * | 10/2008 | King | E05B 67/383 70/58 |

* cited by examiner

*Primary Examiner* — Christopher J Boswell
(74) *Attorney, Agent, or Firm* — R. William Graham

(57) ABSTRACT

An anti-theft device for use in deterring theft of an audio/video device mounted to a bracket which has a male and female housing with a dovetail connection.

13 Claims, 3 Drawing Sheets

ANTI-THEFT DEVICE

This is a continuation-in-part and claims the benefit of U.S. Ser. No. 17/722,349 filed Apr. 17, 2022.

FIELD OF INVENTION

The invention is a device for preventing theft of audio/video devices, such as fish finders and navigation devices and, more specifically, a security device which is mounted to the end portion of the bracket for fish finders and navigation devices in and is adapted to lock over the mounting parts to prevent the detachment of the audio/visual device.

The theft of audio/video devices is a wide spread problem. Since most boats, particularly, fishing boats, are equipped with such devices it is becoming increasingly common for unauthorized persons to steal these audio/visual devices by simply disconnecting them from their mounting brackets when they are left unattended and unguarded for long periods of time.

Commonly, the audio/visual devices are not provided with a locking mechanism which will prevent unauthorized removal. The prior art has provided some attempts at solving this problem, some of these provide a locking mechanism on the bracket but are constructed from plastic. These mechanism are very easily broken with the use of any blunt force object. The use of existing special locks to attempt to provide a degree of security but these simple devices are no match for a thief with the proper tools to destroy or manipulate the lock to easily obtain access to the audio/video device.

The need for a more durable and secure device is needed for protecting such audio/video fish finder/navigational devices.

SUMMARY OF THE INVENTION

It is an object to improve an anti-theft device to secure audio/video device on a boats and/or other environments which employ a mounting bracket for the audio/video equipment.

It is a further object to securely enclose at least a portion of a mounting bracket for an audio/video device which mounts the audio/video device to the mounting bracket.

It is another object to improve design of the anti-theft device to further deter the ability of a thief to break the audio/video device away from the bracket in a manner which does not essentially ruin or destroy the device itself.

Accordingly, the invention is directed to an anti-theft device for use in deterring the theft of an audio/video device mounted to a bracket, which includes:

- a female housing portion having a recessed channel surface extending from a first side inwardly defined by an upwardly extending side surface and a laterally connecting surface through which a bolt receiving open surface extends entirely through to an outer side of the female housing portion, the laterally connecting surface further includes a first lock pin receiving surface extending at least partially into the female housing portion,
- a male housing portion having a protruding surface of a complementary configuration to be slidably received against the recessed channel surface, and having an outwardly extending side surface a laterally connecting surface which respectively mate to the upwardly extending side surface and laterally connecting surface of the female housing portion when mated to one another, and a second lock pin receiving surface extending at least through the male housing portion and which is coaxially aligned with the first lock pin receiving surface when the female housing portion and male housing portion are mated, wherein the bolt receiving open surface and the first lock pin receiving surface are laterally displaced on the laterally connecting surface and are not co-axially aligned
- a push button cam lock having a lock pin and an operably connected keyed portion which upon actuation enables movement of the lock pin from an extended position through the first and second lock pin receiving surfaces thereby preventing movement between the female and male housing portions when mated to a retracted position enabling movement between female and make housing portions.

There is also provided a bolt having a head and a neck which is threaded in a manner to enable securing to a bracket of the audio/video device, the neck extending through the bolt receiving surface and the head retained between the laterally connecting surfaces when the female and male housing portions are mated. Washers can be also provided on either side of the bolt receiving surface of the female housing portion to receive the bolt neck therethrough. A back surface of the female housing portion can include at least one hole to receive a spring pin which is used to seat in a bracket slot and prevent rotation of the anti-theft device.

DETAILED DESCRIPTION OF THE INVENTION

Figure 1:
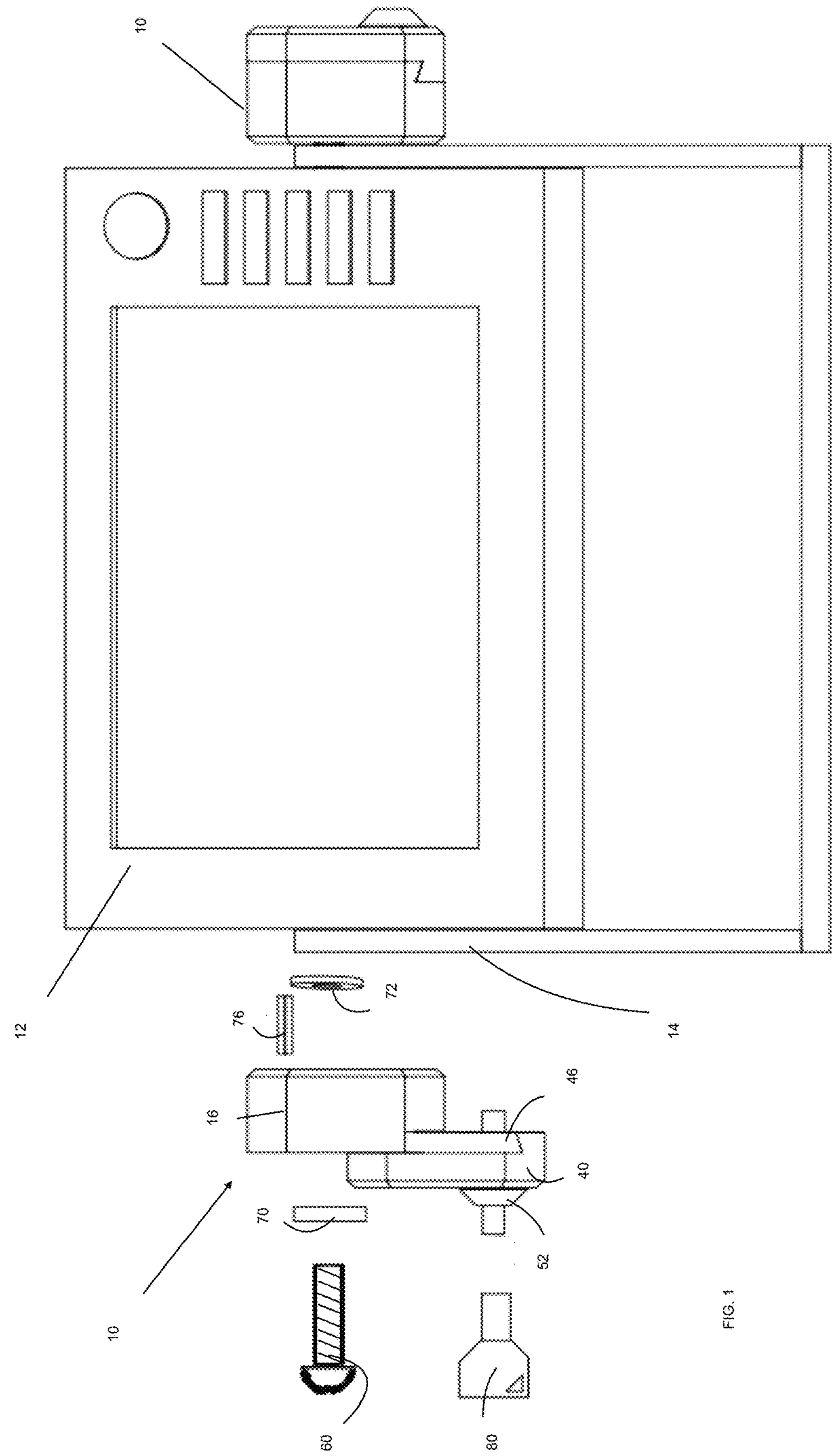
FIG. 1 depicts a partially exploded view of components of the invention adjacent an audio/video device and associated mounting bracket.

Referring now to the drawings, there is shown a preferred embodiment which is directed to an anti-theft device of the instant invention is generally depicted by the number 10. The anti-theft device 10 shown here is depicted in a generally hexagonal configuration is for use in deterring the theft of an audio/video device 12, such as a fish finder or navigation device, which is mounted to a bracket 14.

The anti-theft device 10 includes a female housing portion 16 having a recessed channel surface 18 here shown extending from two connecting sides 20 and 22 inwardly and the recessed channel surface 18 is defined by inclined upwardly inwardly extending side surfaces 24, 26, and 28 and a laterally interconnecting surface 30. A bolt receiving open surface 32 extends entirely through from the laterally interconnecting surface 30 and is generally normal or perpendicular to an outer surface 34 of the female housing portion 16. A first lock pin receiving surface 36 extending at least partially from the laterally connecting surface 30 and generally normal or perpendicular thereto. The bolt receiving open surface 32 is laterally spaced from and not in coaxial alignment with first lock pin receiving surface 36.

A male housing portion 40 has a protruding surface 42 of a complementary configuration to be slidably received into and against the recessed channel surface 18, and has inclined outwardly extending side surfaces 44, 46 and 48 and a laterally connecting surface 49 which respectively mate to the upwardly extending side surfaces 24, 26, and 28 and laterally connecting external surface 30 of the female housing portion 16 when mated to one another.

Figure 3:
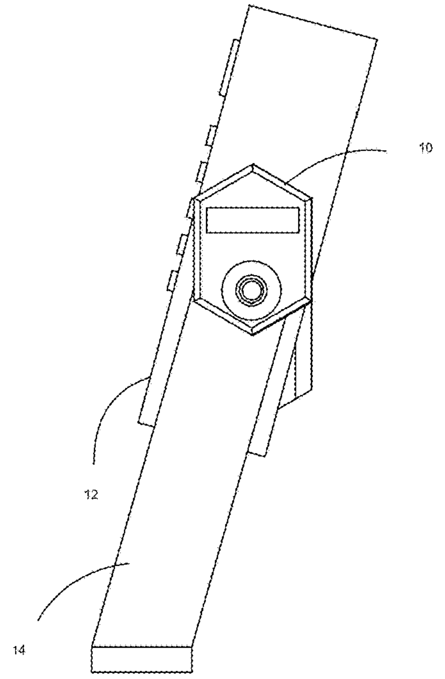
FIG. 3 depicts an end view of FIG. 1.
Figure 4:
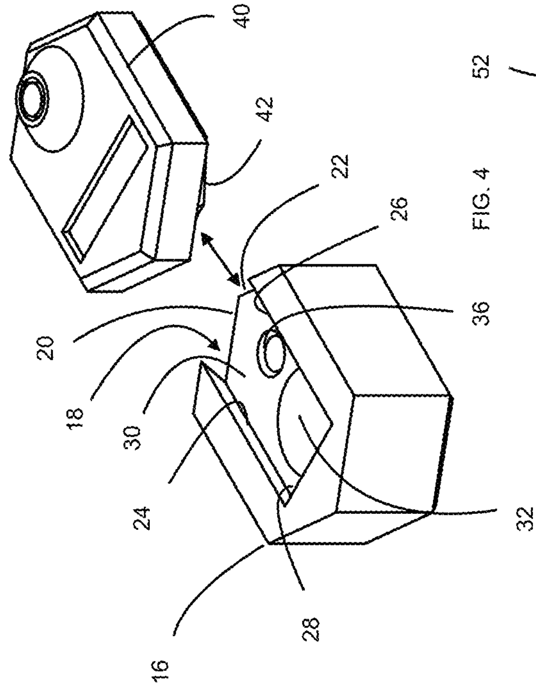
FIG. 4 depicts a perspective view of an anti-theft device of the instant invention in an unmated mode.
Figure 5:
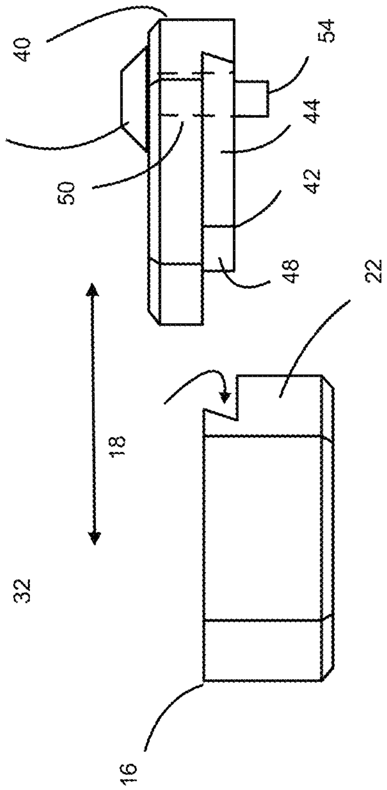
FIG. 5 depicts a side view of FIG. 2.
Figure 6:
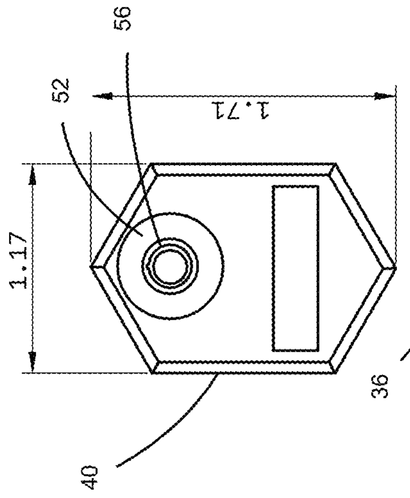
FIG. 6 depicts a plan top view of a male housing portion of the anti-theft device of FIG. 4.
Figure 7:
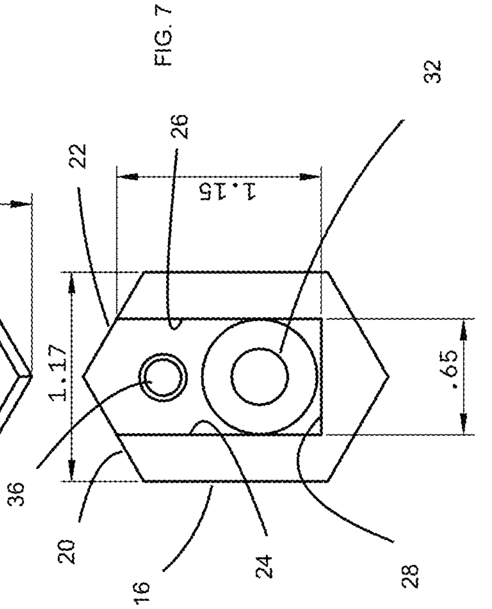
FIG. 7 depicts a plan top view of a female housing portion of the anti-theft device of FIG. 4.
Figure 8:
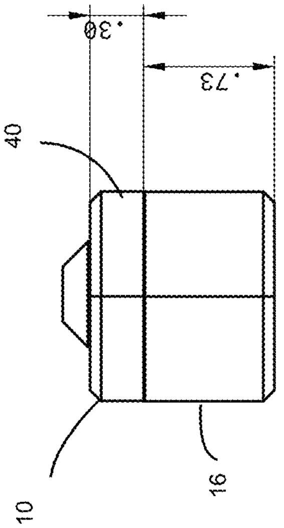
FIG. 8 depicts an end view of a mated antitheft device of the invention.

A dovetail is formed by the lengthwise sliding interconnection between the inclined outwardly extending side surfaces 44, 46 and 48 and a laterally connecting surface 49 which respectively mate to the upwardly inclined extending side surfaces 24, 26, and 28 and laterally connecting external surface 30. FIGS. 3 and 4 depict a lengthwise movement for sliding dovetail interconnection. A second lock pin receiving surface 50 extends through the male housing portion 40 and is generally normal or perpendicular to the laterally extending surface and which is coaxially alignable with the first lock pin receiving surface 36 when the female housing portion 16 and male housing portion 40 are slidably mated and seated, but remain out of co-axial alignment while the male housing portion 40 is being longitudinally slidably connected to the female housing portion 16. In this configuration, the bolt receiving open surface 32 and the first lock pin receiving surface 36 are laterally displaced on the laterally connecting surface 30 and are not co-axially aligned and the furst lock pin receiving surface 36 and second lock pin receiving surface 50 coaxially align only when housing 16 and 40 are completely mated.

The female housing portion 16 and male housing portion 40 are mated to provide an external polygonal configuration which is positionally fixed relative to the audio-video device 12 to deter easy access to cut or break the same. In this regard, the polygonal configuration provides two sides 11 and 13 which intersect by a line 15 and which collectively form an angled peak above the bracket 14 when connected thereto.

A push button cam lock 52 has a lock pin 54 and an operably connected keyed portion 56 which upon actuation enables movement of the lock pin 54 from an extended position through the second and first lock pin receiving surfaces 36, 50 thereby preventing movement between the female and male housing portions 16, 40 when mated to a retracted position enabling movement between female and make housing portions 16, 40.

There is also provided a bolt 60 which can preferably be stainless steel and has a head 62 and a neck 64 which is threaded in a manner to enable securing to bracket 14 for the audio/video device 12, the neck 64 extending through the bolt receiving surface 32 and the head 64 retained between the laterally connecting surfaces 30, 49 when the female and male housing portions 16, 40 are mated. Washers 70, 72 can preferably be nylon and provided on both sides of the bolt receiving surface 32 of the female housing portion 16 to receive the bolt neck 64 therethrough. Back outer surface 34 of the female housing portion 16 can preferably include a plurality of holes 74 to receive a spring pin 76 (preferably stainless steel) which is used to seat in a bracket slot (not shown) and prevent rotation of the anti-theft device 10.

The inclined surfaces 24, 26, and 28 and 44, 46 and 48 provide for a dovetail fit between the female and male housing portions 16 and 40. The antitheft device 10 is provided with a key 80 which in turn operates the cam lock 52. The dimensions and sizes of the device 10 can be varied to accommodate the bracket for the audio/video device. The device 10 is preferable made of a durable anti-theft material such as a metal, alloy or the like.

Figure 2:
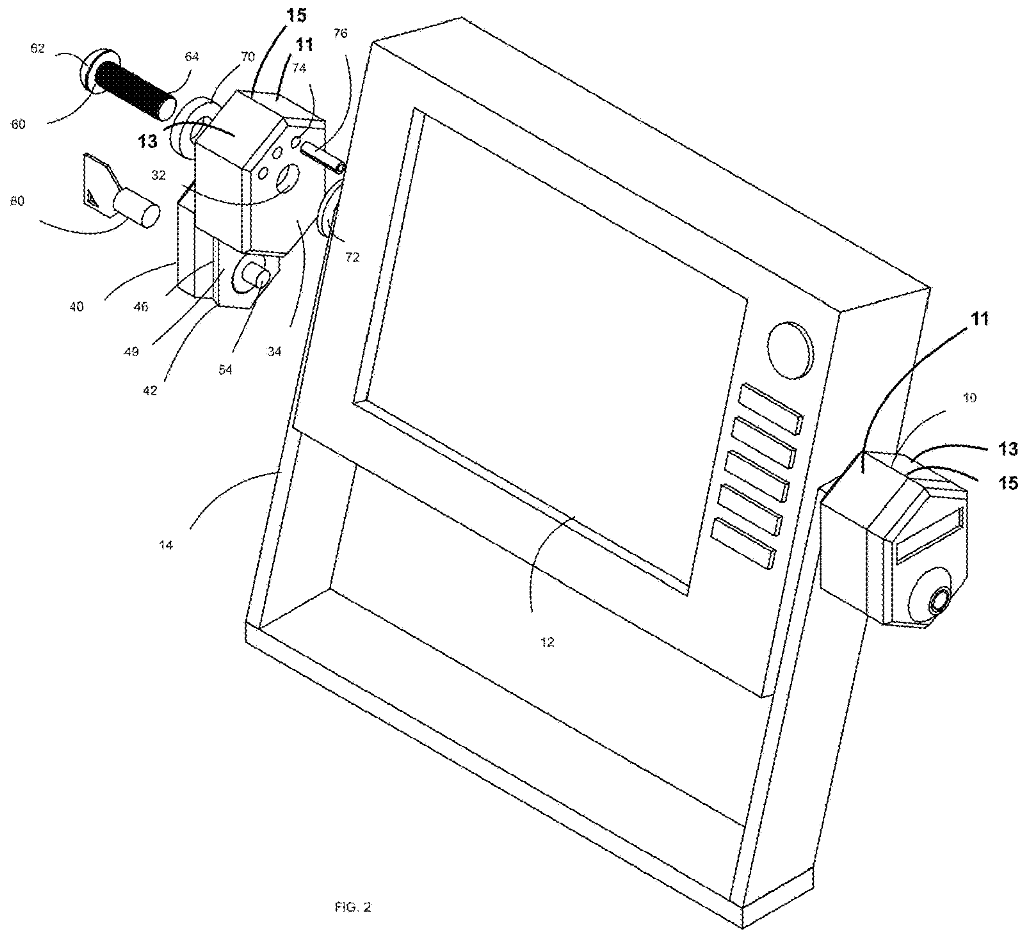
FIG. 2 depicts a perspective view of FIG. 1.

The housing portions 16 and 40 are configured with polygonal configurations, here shown as a hexagonal shape. The polygonal configuration provides enhanced deterence to potential theft as the orientation of acute portions makes it more difficult to break the device 10 as these type of devices are often be subject to various saws and by orienting the device 10 with an acute edge upward as seen in FIG. 1-3 for example, it renders itself awkward to attack with a saw.

While the present invention has been described in terms of a preferred embodiment, it is apparent that other forms could be adopted by one skilled in the art. In other words, the teachings of the present invention encompass any reasonable substitution or equivalents of the claim limitations. Accordingly, the scope of the present invention is to be limited only by the following claims.

What is claimed is:

1. An anti-theft device for use in deterring theft of an audio/video device mounted to a bracket, which includes:

a female housing portion having a recessed channel surface extending from a first side inwardly defined by an upwardly extending side surface and a laterally connecting surface through which a bolt receiving open surface extends entirely through to an outer side of said female housing portion, said laterally connecting surface further includes a first lock pin receiving surface extending at least partially into said female housing portion, wherein said bolt receiving open surface and said first lock pin receiving surface are laterally displaced on said laterally connecting surface and are not co-axially aligned;

a male housing portion having a protruding surface of a complementary configuration to be slidably received against said recessed channel surface, and having an outwardly extending side surface and a laterally connecting surface to which respectively mate to the upwardly extending side surface and laterally connecting surface of said female housing portion when mated to one another, and a second lock pin receiving surface extending at least through said male housing portion and which is coaxially aligned with said first lock pin receiving surface when said female housing portion and male housing portion are mated; and a push button cam lock having a lock pin and an operably connected keyed portion which upon actuation enables movement of said lock pin to an extended position through said first and second lock pin receiving surfaces thereby preventing movement between the female and male housing portions when mated to a retracted position enabling movement between female and male make housing portions.

2. The anti-theft device of claim 1, which includes a key operably keyed to said push button cam lock.

3. The anti-theft device of claim 1, which includes a bolt having a head and a neck which is threaded in a manner to enable securing to a bracket of the audio/video device, said neck extending through said bolt receiving surface and said head retained between said the laterally connecting surfaces when said female and male housing portions are mated.

4. The anti-theft device of claim 3, which includes washers provided on each side of said bolt receiving surface of the female housing portion and to receive the bolt neck therethrough.

5. The anti-theft device of claim 1, wherein said male housing portion and said female housing portion provide an external polygonal configuration having two sides which intersect by a line and which collectively form an angled peak above the bracket when connected thereto and positionally fixed relative to the audio-video device to deter easy access to cut or break the same.

6. The anti-theft device of claim 1, wherein an outer surface of said female housing portion includes at least one inwardly extending hole and to removably receive a spring pin which is used to seat in a bracket slot and prevent rotation of said anti-theft device.

7. The anti-theft device of claim 1, wherein a dovetail is formed by a lengthwise sliding interconnection between said upwardly extending side surface, said outwardly extending side surface and said laterally connecting surfaces.

8. An anti-theft device for use in deterring theft of an audio/video device mounted to a bracket, which includes:

a female housing portion having a recessed channel surface extending from a first side inwardly defined by an inclined upwardly extending side surface and a laterally connecting surface through which a bolt receiving open surface extends entirely through to an outer side of said female housing portion, said laterally connecting surface further includes a first lock pin receiving surface extending at least partially into said female housing portion;

a male housing portion having a protruding surface of a complementary configuration to be slidably received against said recessed channel surface, and having an outwardly inclined extending side surface and a laterally connecting surface which respectively mate to said upwardly inclined extending side surface and laterally connecting surface of said female housing portion when mated to one another, and a second lock pin receiving surface extending at least through said male housing portion and which is coaxially aligned with said first lock pin receiving surface when said female housing portion and male housing portion are mated;

a push button cam lock disposed in said male housing portion having a lock pin and an operably connected keyed portion which in a retracted position permits said male housing portion to be slidably received adjacent said female housing portion and upon actuation enables movement of said lock pin to an extended position through said first and second lock pin receiving surfaces thereby preventing movement between the female housing portion and said male housing portion; and wherein said bolt receiving open surface and said first lock pin receiving surface are laterally displaced on said laterally connecting surface and are not co-axially aligned.

9. The anti-theft device of claim 8, wherein an outer surface of said female housing portion can include at least one inwardly extending hole to selectively removably receive a spring pin which is used to seat in a bracket slot and prevent rotation of the anti-theft device.

10. The anti-theft device of claim 8, which includes a key operably keyed to said push button cam lock.

11. The anti-theft device of claim 8, which includes a bolt having a head and a neck which is threaded in a manner to enable securing to a bracket of the audio/video device, said neck extending through said bolt receiving surface and said head retained between said laterally connecting surfaces when said female and male housing portions are mated.

12. The anti-theft device of claim 8, which includes washers provided on each side of said bolt receiving surface of said female housing portion and to receive said bolt neck therethrough.

13. The anti-theft device of claim 8, wherein a dovetail is formed by a lengthwise sliding interconnection between said upwardly inclined extending side surface, said outwardly inclined extending side surface and said laterally connecting surfaces.

* * * * *